UNITED STATES PATENT OFFICE.

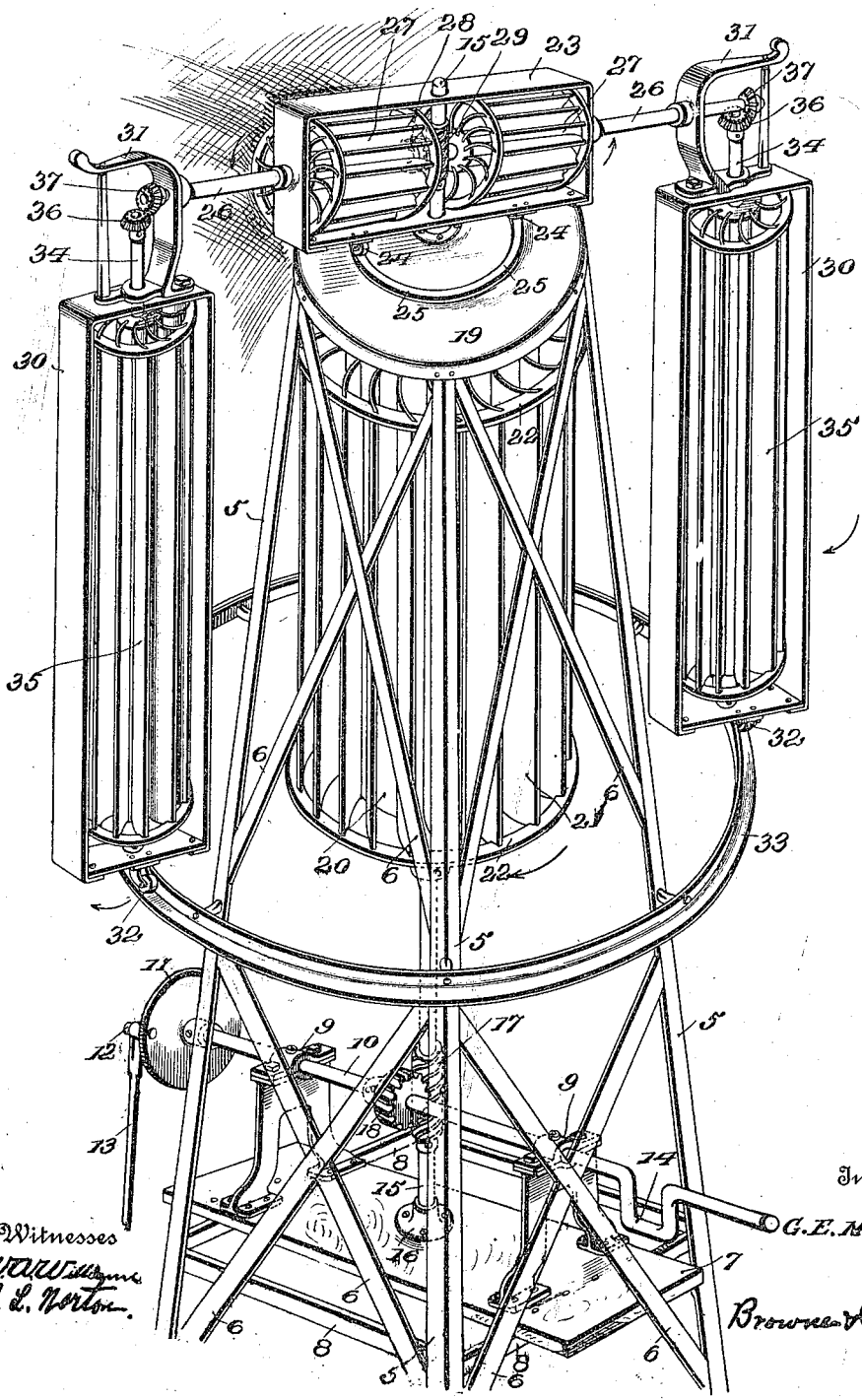

GEORGE E. McCLENDON, OF HERMOSILLO, MEXICO, ASSIGNOR OF ONE-HALF TO GUSTAVO ZAMORA AND ONE-FOURTH TO FRANK SMITH, OF HERMOSILLO, MEXICO.

WIND-MOTOR.

989,509.          Specification of Letters Patent.     Patented Apr. 11, 1911.

Application filed January 27, 1911. Serial No. 505,106.

*To all whom it may concern:*

Be it known that I, GEORGE E. MCCLENDON, a citizen of the United States, residing at Hermosillo, State of Sonora, Mexico, have invented certain new and useful Improvements in Wind-Motors, of which the following is a specification.

My invention relates to certain new and useful improvements in wind motors, and the object thereof is to produce a simple, compact and efficient structure, composed of few parts, and which is cheap to construct and not likely to get out of order.

The wind-motor herein disclosed is a modification of the invention disclosed in my co-pending application 596,686, filed December 10, 1910.

With these and other objects in view my invention consists in certain constructions, combinations, and arrangements of parts, the preferred form of which will be first described in connection with the accompanying drawings, and then the invention particularly pointed out in the appended claims.

The drawing is a perspective view of the preferred embodiment of my invention.

5 designates the uprights of a tower of any suitable height and 6 designates the crossed braces for said uprights, the whole providing a supporting frame, which however may be of any other form as may be found desirable. Mounted on a platform 7, supported on the cross bars 8, carried by the uprights 5, are a pair of journal bearings 9, in which is supported a shaft 10, adapted to be driven as hereinafter described. From this shaft power can be taken off by any suitable means, as by a disk 11, fast on the shaft, which carries a wrist pin 12, to which is connected one end of a connecting rod 13. Power may also be taken off the shaft 10 from a crank 14, or in any other way desired.

15 designates a vertical shaft which at its lower end is stepped in a bearing 16 mounted on the platform 7. This shaft 15 carries a worm 17 meshing with a gear 18, fast on the shaft 10, whereby power is transmitted from the shaft 15 to the shaft 10. The shaft 15 near its upper end passes through a platform 19 mounted on the upper ends of the uprights 5. Fast on the shaft 15, below the platform 19, is a hub 20, from which project the vanes 21, the outer ends of the vanes being suitably secured in rings 22 at their upper and lower edges. The vanes are suitably curved as shown, so that the wheel will be rotated by the wind irrespective of its direction.

Loosely mounted on the shaft 15, above the platform 19, is rectangular frame 23. This frame is supported by rollers 24 running on a circular track 25 mounted on top of the platform 19. Extending transversely through the frame 23 is the horizontal shaft 26, which carries a pair of wheels 27, similar in construction to the wheel on the vertical shaft 15. These wheels 27 are spaced apart, and 28 is a gear fast on the shaft 26 between the wheels 27, which meshes with a worm 29 fast on the vertical shaft 15.

30 designates a pair of vertically arranged rectangular frames, from the upper end of each of which extends an arm 31, through which loosely pass the opposite ends of the shaft 26. Each frame 30 is provided on its lower end with a roller 32 which runs on a track 33 secured to and surrounding the uprights 5. Extending vertically of each of the frames 30 is a shaft 34, on which is secured a wind wheel 35 similar in construction to the wheel on the shaft 15 previously described. Each of the shafts 34 carries at its upper end a bevel gear 36 meshing with a bevel gear 37, whereby the rotation of the shafts 34 is communicated to the shaft 26.

From the foregoing construction of the preferred form of my invention it will be evident that the wheels 27, 27, and the wheels 35, 35 can swing so as to face into the wind, that the wheel on the shaft 15 will be rotated irrespective of the direction of the wind, and as all the wheels are geared together the power of all of them will be delivered to the shaft 10.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

1. In a wind motor the combination with a vertical shaft of a wind wheel fast on the shaft, a horizontal platform supported above the wind wheel and through which the vertical shaft passes, a bracket rotatably mounted on the shaft, supporting rollers carried by the bracket and running on the platform, a wind wheel rotatably mounted in the bracket and gearing between the last mentioned wheel and the shaft.

2. In a wind motor the combination with a vertical shaft of a wind wheel fast on the shaft, a horizontal bracket rotatably mounted on the shaft above the wheel, a wind wheel rotatably mounted in the bracket, gearing between the last mentioned wheel and the vertical shaft, a pair of vertical brackets flanking the vertical shaft, a wind wheel journaled in each of the brackets, and gearing connecting said last mentioned wheels to the wheel in the horizontal bracket.

3. In a wind motor the combination with the supporting frame of a vertical shaft mounted in the supporting frame, a wind wheel fast on the shaft, a platform mounted on the frame above the wind wheel and through which the shaft passes, a pair of brackets flanking the vertical shaft, a wind wheel mounted in each bracket, a circular track mounted on the frame, a roller on each bracket running on the track, and gearing between the wind wheels in the brackets and the vertical shafts.

In testimony whereof I affix my signature in presence of two witnesses.

GEORGE E. McCLENDON.

Witnesses:
F. L. BROWNE,
GEO. S. LIVINGSTON.